United States Patent [19]

Metz

[11] 4,300,948

[45] Nov. 17, 1981

[54] METHOD OF CONTINUOUS REDUCTION OF IRON OXIDES

[75] Inventor: Paul Metz, Luxembourg, Luxembourg

[73] Assignee: Arbed S.A., Luxembourg, Luxembourg

[21] Appl. No.: 138,422

[22] Filed: Apr. 8, 1980

[30] Foreign Application Priority Data

Jun. 26, 1979 [LU] Luxembourg ............................ 81427

[51] Int. Cl.$^3$ ............................................ C21B 13/00
[52] U.S. Cl. ............................................ 75/34; 75/25
[58] Field of Search ............................ 75/34, 35, 26, 25

[56] References Cited

U.S. PATENT DOCUMENTS 3,770,417  11/1973  Kranz ...................................... 75/34

*Primary Examiner*—M. J. Andrews
*Attorney, Agent, or Firm*—Karl F. Ross

[57] ABSTRACT

A method of and an apparatus for the reduction of iron oxides continuously comprises a reducing vessel through which the iron oxide is passed and in which it is contacted with a reducing gas continuously withdrawn from a coking furnace during the second phase of the coking operation in which the effluent gas is rich in carbon monoxide and hydrogen.

8 Claims, 2 Drawing Figures

METHOD OF CONTINUOUS REDUCTION OF IRON OXIDES

FIELD OF THE INVENTION

My present invention relates to a method of continuous reduction of iron oxides and, more particularly, the direct reduction of ore or enriched iron ores to produce sponge iron or a reduced form of the iron oxides capable of use in metallurgical plants as a raw material in the production of steel.

BACKGROUND OF THE INVENTION

In recent years there has been increased interest in direct reduction processes for the preparation of iron in a form in which it can be used in more advanced metallurgical processes, namely, the production of steel. In the direct reduction of iron ores, i.e. iron oxide, it is common to utilize a mixture of about 75% hydrogen and 25% carbon monoxide as the reducing gas. The gaseous mixture is generally obtained by reacting natural gas, which preferably has been desulfurized, with water vapor in a cracking process.

However, natural gas is increasingly expensive and desirable for other purposes, limiting the degree to which it can be used in processes such as the reduction of iron oxides. Furthermore, there are many countries in which natural gas is unavailable or is available only at prohibitive cost.

OBJECTS OF THE INVENTION

It is thus the principal object of the present invention to provide a process for the continuous reduction of iron oxides which eliminates the need for natural gas in the production of the reducing gas.

Another object of the invention is to provide a method of continuously and directly reducing iron ores which yields a high quality product free from a tendency to auto-ignite and which is more economical and fuel efficient than earlier systems.

SUMMARY OF THE INVENTION

These objects and others which are obtained in accordance with the present invention can be achieved by the continuous reduction of materials containing iron oxides in a reducing reactor by subjecting the materials to the reducing action of a gas consisting predominantly of hydrogen and carbon monoxide and which is produced during the second half of the coking period of a coking furnace, the gas being fed substantially at its temperature as derived from the coking furnace to the reducing reactor.

My invention is thus based upon my discovery that the gas formed during the second half of the cokefication reaction of coal in a coking furnace contains hydrogen and carbon monoxide in proportions substantially similar to those hitherto used in direct-reduction gases derived from natural gas. This discovery is based upon measurements of the variable levels of hydrogen and carbon monoxide during the course of the coking operation and the gaseous product during the second half of the coking process is found to approach in composition the gas produced by cracking methane with water vapor. This coking gas, moreover, has practically no carbon dioxide and water vapor or levels of $CO_2$ and $H_2O$ which are below those of the cracking gases so that the unfavorable action of the $CO_2$ and $H_2O$ upon the reducing reaction is less with the system of the present invention than heretofore.

The reducing gas of the present invention consists essentially of 60 to 80% hydrogen and 20 to 40% carbon monoxide with small quantities, practically without effect on the reaction, of methane and carbon dioxide.

Furthermore, the gas is obtained from the coking furnace at a temperature between 700° C. and 900° C. which I have found is ideal for the direct reduction of the iron oxides, thereby ensuring that this gas should be fed directly from the coking furnace to the interior of the reducing reactor.

The system of the present invention has the important advantage that the energy balance of the plant is improved and energy consumption in providing the heat necessary for the reducing reaction is diminished. Heretofore, the gases formed in the coking furnace, after recuperation of heat for coking purposes, had to be cooled before these gases could be used for other purposes, e.g. heating gases, turbine-driving and the like. With the system of the present invention, the entire heat content of the reducing gas produced in the second half of the coking reaction is utilized.

According to another feature of the invention, the oxides are introduced into the reducing reactor in a calibrated form, preferably in the form of pellets of uniform size, and can be iron-ore pellets or granules or calibrated pellets or granules of oxidic metallurgical residues, such as the dust and wastes of a blast furnace or steel making plant, slag or residues from reheating furnaces or soaking pits, scale from rolling mills or the like.

According to another feature of the invention, the reduction reaction is carried out at a slightly superatmospheric pressure, i.e. the reducing gas is fed into the reactor at a slight superatmospheric pressure. Experience has shown that the reducing treatment, applied under pressure to pelletized material matter, increases the degree of reduction to more than offset the cost of pelletization and generating the elevated pressure.

According to yet another feature of the invention, a small proportion of methane or another hydrocarbon can be added to the reducing gas derived from the coking furnace. Apparently the hydrocarbon thus added cracks in the interior of the reducing vessel to deposit a fine layer of carbon upon the surface of the mineral to act as a passivation layer. This passivation layer prevents or limits the tendency toward spontaneous ignition upon contact of the pellets with the oxygen of air as they leave the furnace. It is well known that pellets reduced with gases rich in hydrogen tend to be pyrophoric.

According to yet another feature of the invention, reducing agents of high reactivity in solid form are added to the iron oxides before these materials are introduced into the reducing reactor. Such materials can include lignite-coke powder, lignite powder, dried peat powder or wood charcoal powder.

According to the invention, the reduced material is subjected to a continuous briquetting operation immediately upon its formation as it is discharged from the continuous reducing unit to increase the density of this material. The briquetting has been found to increase the ability of the material to avoid spontaneous ignition and may be used in conjunction with or as an alternative to the deposition of the passivation layer upon the material as described above. The process of the present invention thus avoids serious accidents from spontaneous ignition as have plagued earlier direct reduction systems.

The installations in which the present method is carried out may make use of any continuous reduction furnace but preferably utilizes a system of the traveling-grate type in which the oxide is carried upon an endless-type grate conveyor through a reducing chamber from an input chamber to an output chamber, the material being contacted in the reducing chamber with gas directly delivered from a coking furnace during the second half of the coking operation therein. In other words, the apparatus also includes the coking furnace and a pipe system for delivering the gases generated during the second half of a coking operation to the reducing chamber.

According to a feature of the invention, the input and output chambers are connected to a source of gas which is different from that supplied to the reducing chamber, advantageously another coking furnace. The source of the other gas may thus be a coking furnace operating in the first half of the cokefication process.

The apparatus of the present invention also advantageously includes a plurality of hoods disposed above the traveling-grate conveyor and hoods disposed below the latter for discharging the reducing gas through the grate and the pellets lying thereon, the hoods above this path collecting the gas.

This arrangement permits the hoods to be connected in series so that the reducing gas traverses the bed of the material to be reduced in a plurality of passes and increases the reduction which can be carried out by the gas.

According to another feature of the invention, means is provided to circulate the reducing gas through the reducing chamber either by evacuating the withdrawn gas or by pressurizing the introduced gas such means being dimensioned, moreover, to maintain a slight superatmospheric pressure in the reducing chamber.

The means for supplying the other gas to the input and output chambers may also be dimensioned to deliver a pressure greater than that which prevails in the hoods of the reducing chamber. The latter expedient is intended to limit the loss of the valuable reducing gas from the reducing chamber. For the reasons described above, moreover, a briquetting unit is provided directly adjacent the outlet of the reducing installation.

BRIEF DESCRIPTION OF THE DRAWING

An apparatus for carrying out the method of the present invention has been illustrated in the accompanying drawing in which.

SPECIFIC DESCRIPTION

Figure 1:
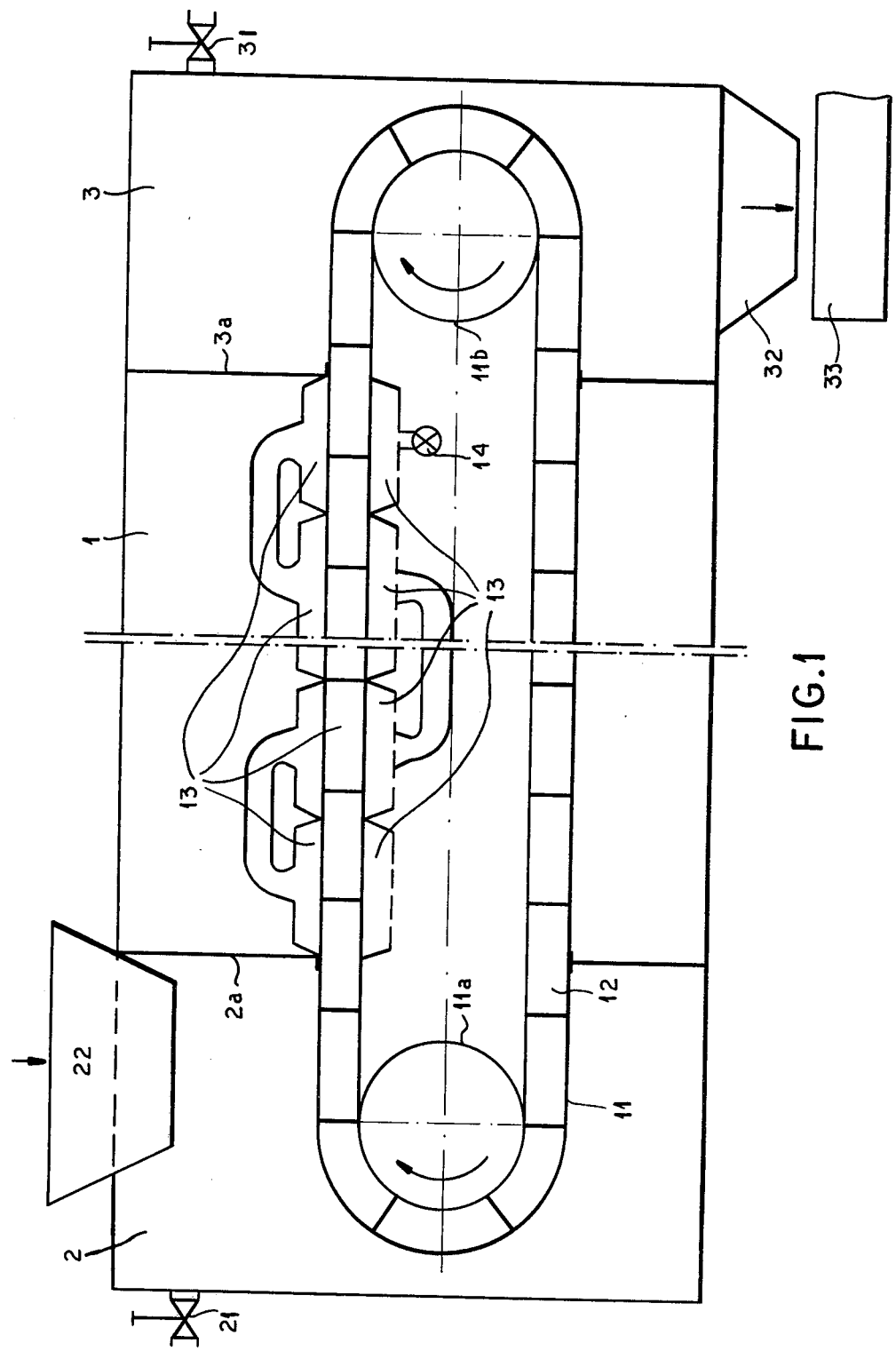
FIG. 1 is a diagrammatic cross-sectional view showing the reducing installation.

The reducing installation shown in FIG. 1 comprises a central reducing chamber 1, an input chamber 2 and an output or discharge chamber 3 separated by partitions 2a and 3a from the reducing chamber 1.

A traveling grate 11, of the endless conveyor type, supported upon rollers 11a and 11b, is formed with compartments 12 receiving the oxidic material and passing between the upper and lower hoods 13 which are connected in series to permit the reducing gas, introduced through the valve 14, to pass upwardly and downwardly through the grate and the iron oxide a plurality of times in an upstream direction while the material travels to the right i.e. in the downstream direction.

The valve 14 may serve to add a small quantity of methane or another hydrocarbon to the reducing gas as well.

The valves 21 and 31 permit introduction of a less reductive coking gas to the input and output chambers 2 and 3 while funnels 22 and 32 at the input chamber and output chamber, (allowing only), to introduce the pellets and discharge the reduced products, respectively. The chute 32 opens directly to a briquetting unit represented at 33.

Figure 2:
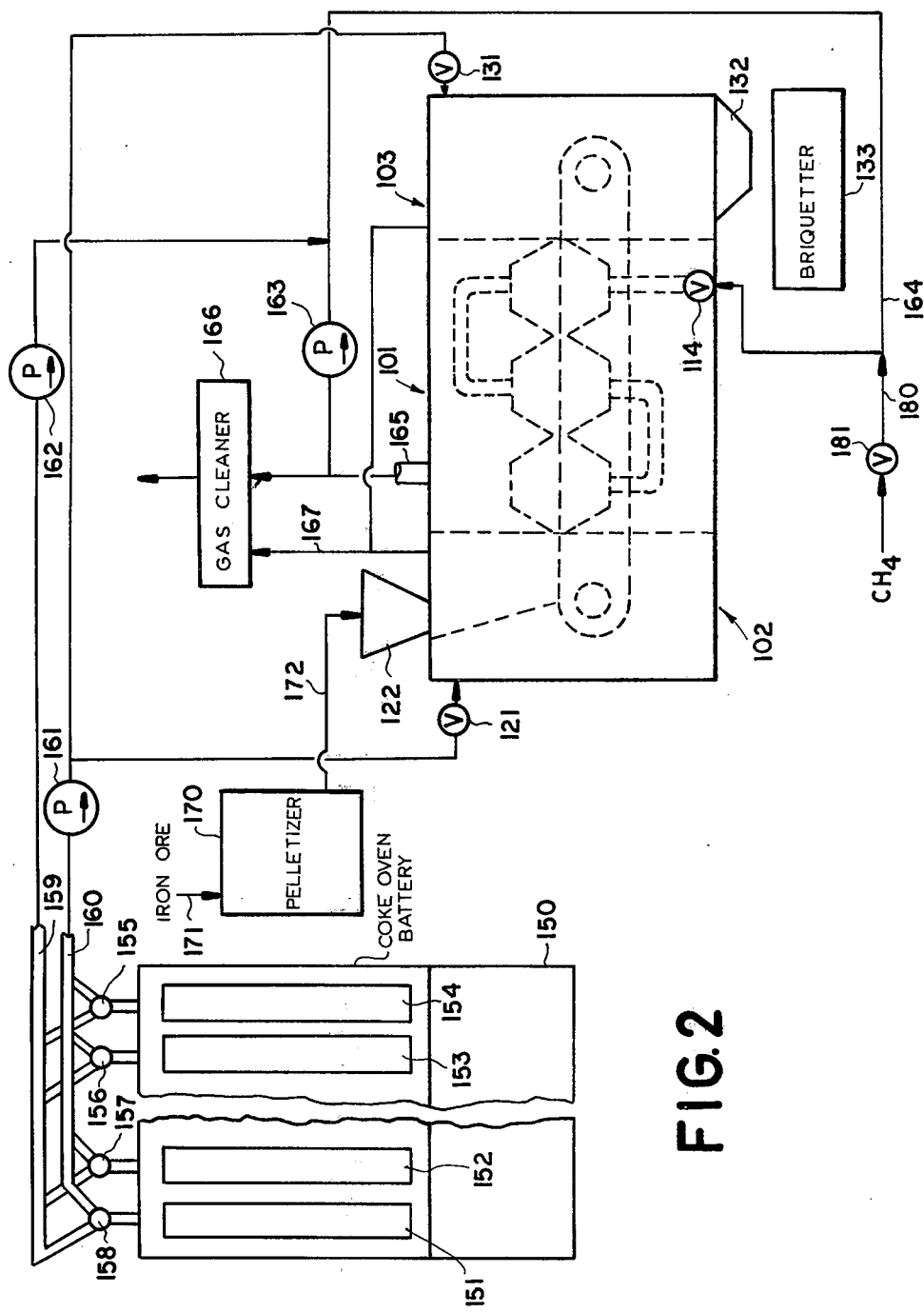
FIG. 2 is a flow diagram showing the reducing installation of FIG. 1 in association with other parts of the plant.

In FIG. 2, in which reference numerals corresponding to those of FIG. 1, preceded by a hundreds digit, are used to designate similarly functioning elements, I have shown the coking furnace 150 which, like any conventional coke battery, can comprise a plurality of coking ovens only four of which have been illustrated at 151–154.

Distributing valves 155–158 from these coke ovens selectively deliver the gases to the lines 159 and 160, the former serving to carry the gas during the second half of the coke process while the latter carries off the gas from the first half of the coking process.

Line 159 is provided with a pump or blower 162 and introduces the reducing gas via line 164 and valve 114 to the hoods 113 of the reducing chamber 101. The pump 162 also serves to raise the pressure in the reducing chamber to a slightly superatmospheric level.

The reducing gas can be recirculated by a pump 163 as it is discharged from the chamber 101 via outlet 165 which can also be connected to a gas cleaning plant 166. Methane can be introduced via the valve 181 and the line 180 connected to the valve 114.

The iron ore is preferably delivered at 171 or to some other conventional device for ensuring uniformity of particle size of the oxidic materials before they are treated with the reducing gas, the pellets being fed at 172 to the hopper 122 of the input chamber 102.

The gases from the first half of the coking process are fed via pump 161 and valves 121, 131 to the input and output chambers 102, 103 at a pressure slightly greater than the pressure in the hoods 113, the discharged gas at 167 being fed to the gas cleaner 166.

In operation, the valves 155–158 are switched over in the succession in which each coke oven undergoes cokefication and after the lapse of the first half of the coking period to ensure that line 159 receives only the second half gases and line 160 only the first half gases. The reduced product is discharged through chute 132 to the briquetter 133 as previously described.

I claim:

1. A method of reducing iron oxide material which comprises the steps of:
   (a) coking coal in a coke oven for a predetermined length of time in a cokefication process and producing coke-oven gas during this length of time in said coke oven;
   (b) continuously drawing hot coke-oven gas consisting predominantly of hydrogen and carbon monoxide from said coke oven during the second half of a time of said cokefication process;
   (c) feeding iron oxide material to a reducing chamber separated from said coke oven;
   (d) continuously contacting said iron oxide material in said chamber with said coke-oven gas drawn from said coke oven to reduce said material directly at substantially the temperature at which said coke-oven gas was drawn in step (b); and (e) discharging the reduced material.

2. The method defined in claim 1 wherein said coke-oven gas drawn from said coke oven in step (b) consists essentially of 60 to 80% by volume hydrogen and 20 to 40% by volume carbon monoxide.

3. The method defined in claim 2 wherein the coke-oven gas drawn from said coke oven in step (b) and contacted with said iron oxide material in step (d) is at a temperature of 700° C. to 900° C.

4. The method defined in claim 1, claim 2 or claim 3 wherein said iron oxide material is selected from the group which consists of iron ore, and dust, powder or pellets containing metallurgical residues of blast furnaces and steel refining furnaces, reheating furnace particles and rolling mill scales.

5. The method defined in claim 1, claim 2 or claim 3 wherein the contact of said coke-oven gas drawn in step (b) with said material in step (d) is effected under super-atmospheric pressure.

6. The method defined in claim 1, claim 2 or claim 3, further comprising the step of adding a small quantity of a hydrocarbon to said coke-oven gas as drawn in step (b) prior to contacting it with said material in step (d).

7. The method defined in claim 1, further comprising the step of mixing a solid reducing agent of high reactivity with said material proor to step (d).

8. The method defined in claim 1 or claim 3 wherein, in step (e), the reduced material is briquetted.

* * * * *